(12) United States Patent
Pausch et al.

(10) Patent No.: US 6,494,486 B2
(45) Date of Patent: *Dec. 17, 2002

(54) GAS BAG DEVICE WITH A TENSIONING CORD AND AUTOMOBILE THEREWITH

(75) Inventors: Tobias Pausch, Berlin (DE); Dieter Markfort, Berlin (DE); Heinz-dieter Adomeit, Berlin (DE)

(73) Assignee: Takata-Petri AG, Aschaffenburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,215
(22) PCT Filed: Dec. 15, 1997
(86) PCT No.: PCT/DE97/02968

§ 371 (c)(1),
(2), (4) Date: Jun. 16, 1999

(87) PCT Pub. No.: WO98/26959
PCT Pub. Date: Jun. 25, 1998

(65) Prior Publication Data

US 2002/0053785 A1 May 9, 2002

(30) Foreign Application Priority Data

Dec. 17, 1996 (DE) .......................... 196 54 490
Feb. 14, 1997 (DE) .......................... 197 07 347

(51) Int. Cl.$^7$ ........................ B60R 21/16; B60R 21/22
(52) U.S. Cl. ................ 280/743.2; 280/743.1; 280/730.2
(58) Field of Search ............... 280/728.1, 730.1, 280/730.2, 743.1, 743.2; 24/171, 136 R

(56) References Cited

U.S. PATENT DOCUMENTS

| | | | | |
|---|---|---|---|---|
| 3,494,571 A | * | 2/1970 | Stoffel | 24/171 |
| 3,758,922 A | * | 9/1973 | Field | 24/136 R |
| 3,774,936 A | * | 11/1973 | Barnett et al. | 280/730.1 |
| 4,670,948 A | * | 6/1987 | Rutgersson | 24/136 R |
| 5,044,663 A | | 9/1991 | Seizert | |
| 5,462,308 A | * | 10/1995 | Seki et al. | 280/730.2 |

(List continued on next page.)

FOREIGN PATENT DOCUMENTS

| | | |
|---|---|---|
| DE | G 94 15 511.9 | 1/1995 |
| DE | 195 19 297 A1 | 12/1995 |
| EP | 0 584 781 | * 3/1994 |
| GB | 2 312 877 | * 11/1997 |
| JP | 405193430 | * 8/1993 |
| WO | WO 94/19215 | 9/1994 |

*Primary Examiner*—Paul N. Dickson
*Assistant Examiner*—Ruth Ilan
(74) *Attorney, Agent, or Firm*—Foley & Lardner

(57) ABSTRACT

The invention relates to an airbag, especially a lateral airbag, preferably in the shape of a tube, which is connected to at least two points on the motor vehicle and accommodated in its non-inflated state in a curved storage area. The invention provides for at least one tensioning cord (3) between the gas bag and a point of attachment to the motor vehicle, whereby said tensioning cord (3) can be tautened by the inflating gas bag. A preferred version provides for the tensioning cord (3) to be attached with one end to the gas bag (8) and with the other end to the motor vehicle (F1), whereby, when the gas bag inflates, the cord's point of attachment on the gas bag, together with the gas bag, is able to move away from the point (F1) where the tensioning cord (3) is attache to the motor vehicle. In this way the gas bag can be tautened without the need for additional mechanical or electrical components.

31 Claims, 16 Drawing Sheets

U.S. PATENT DOCUMENTS

| | | | | |
|---|---|---|---|---|
| 5,480,181 A | * | 1/1996 | Bark et al. | 280/730.2 |
| 5,609,363 A | * | 3/1997 | Finellii | 280/743.2 |
| 5,636,862 A | * | 6/1997 | Cheung et al. | 280/730.2 |
| 5,752,713 A | * | 5/1998 | Matsuura et al. | 280/730.2 |
| 5,755,457 A | * | 5/1998 | Specht | 280/730.2 |
| 5,865,462 A | * | 2/1999 | Robins et al. | 280/730.2 |
| 5,868,421 A | * | 2/1999 | Eyrainer | 280/730.2 |
| 5,924,722 A | * | 7/1999 | Koide et al. | 280/730.2 |

* cited by examiner

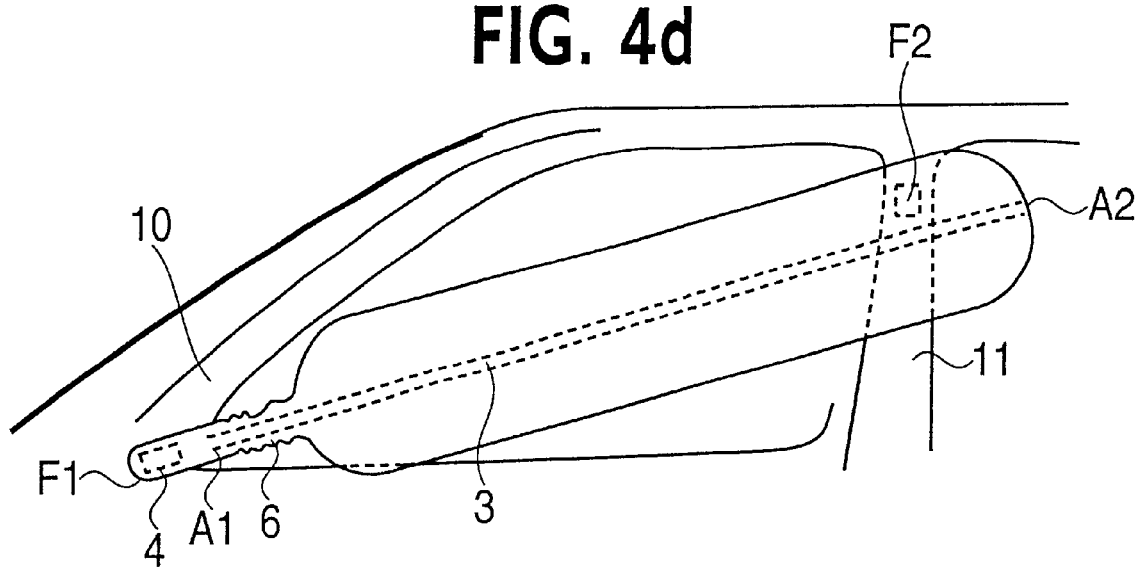

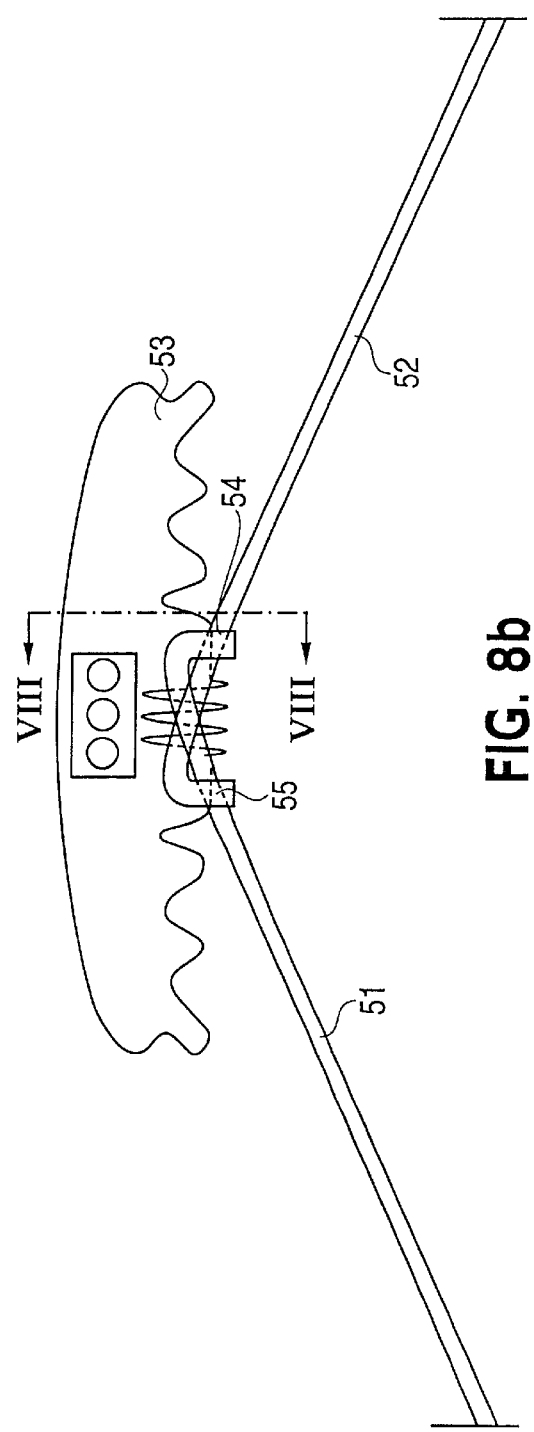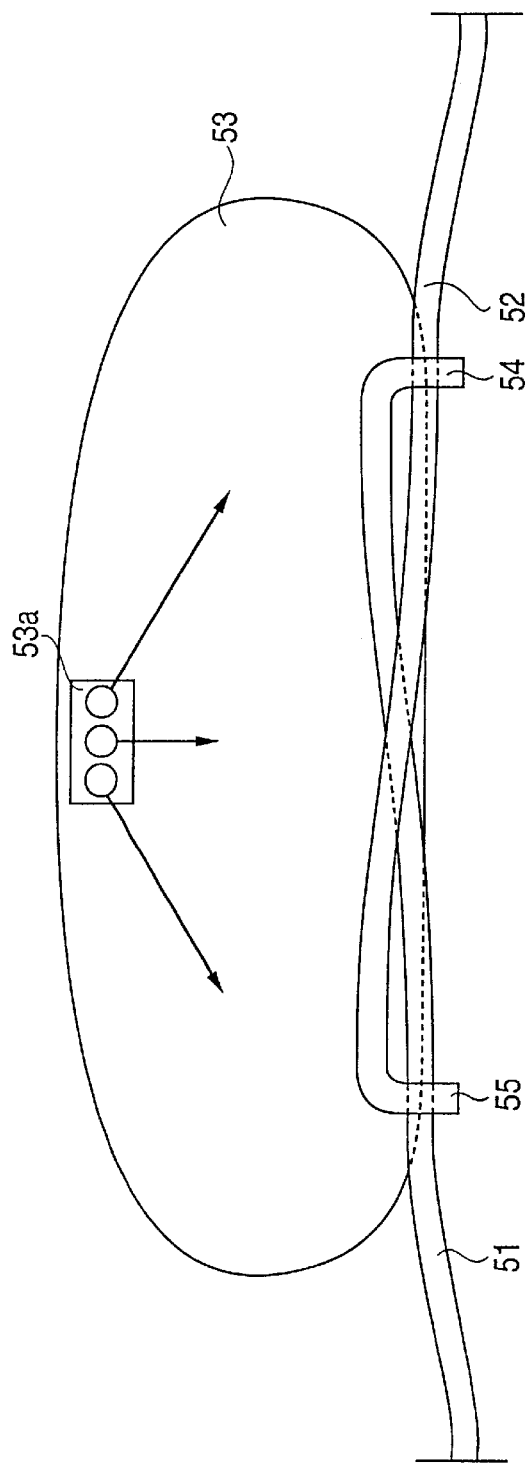

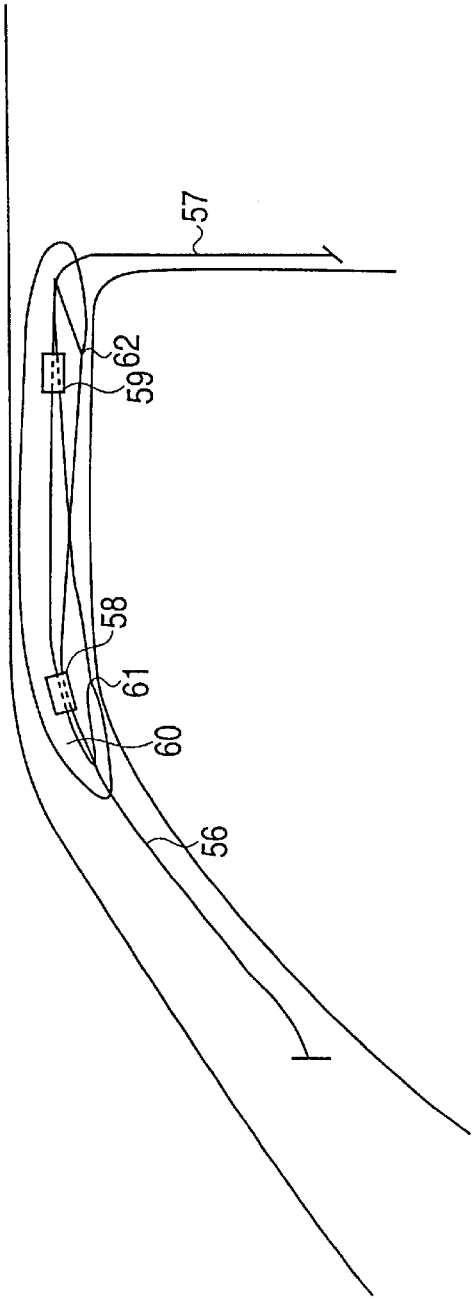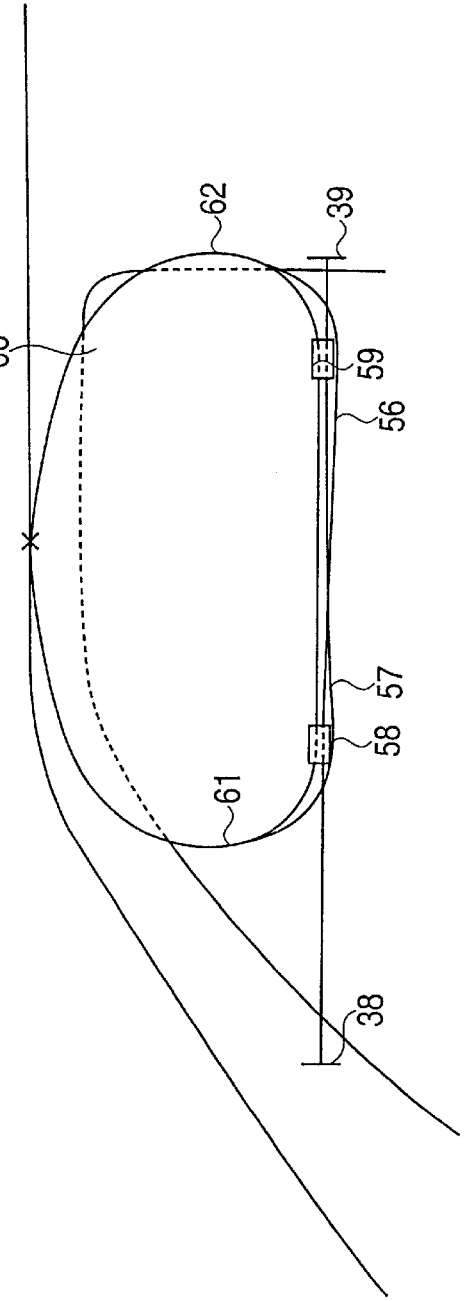

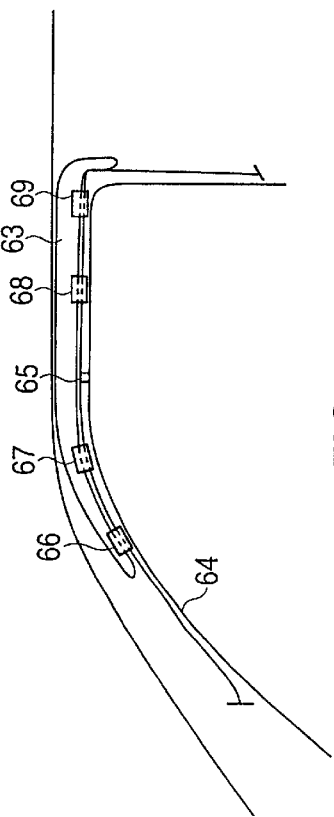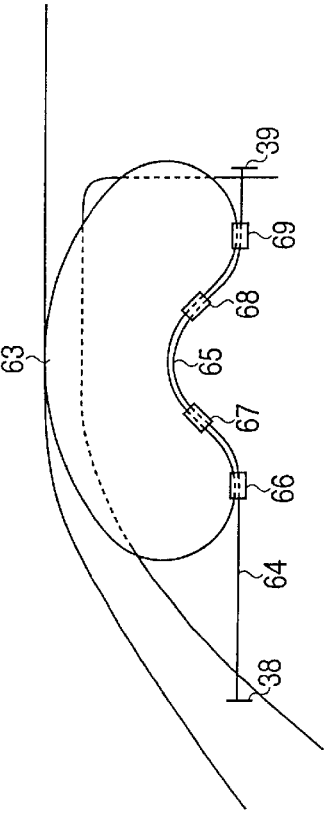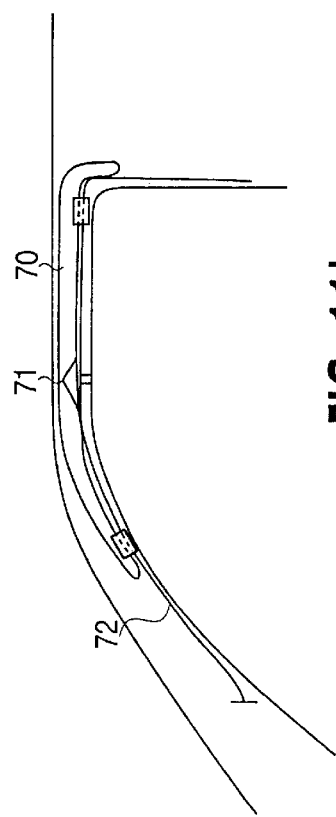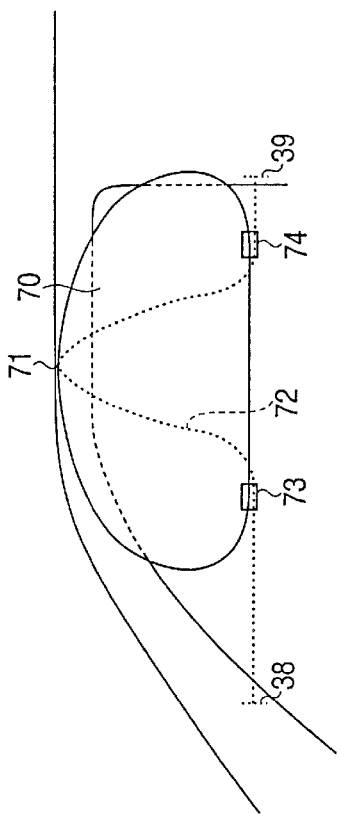

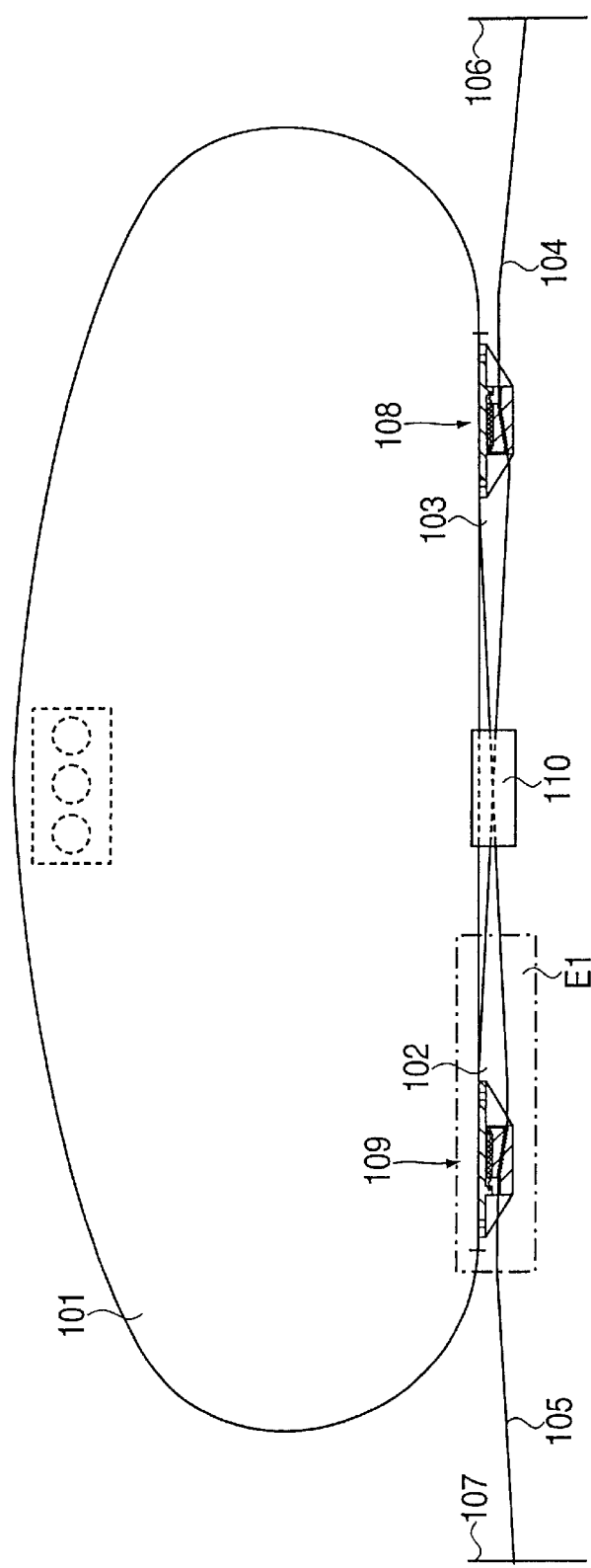
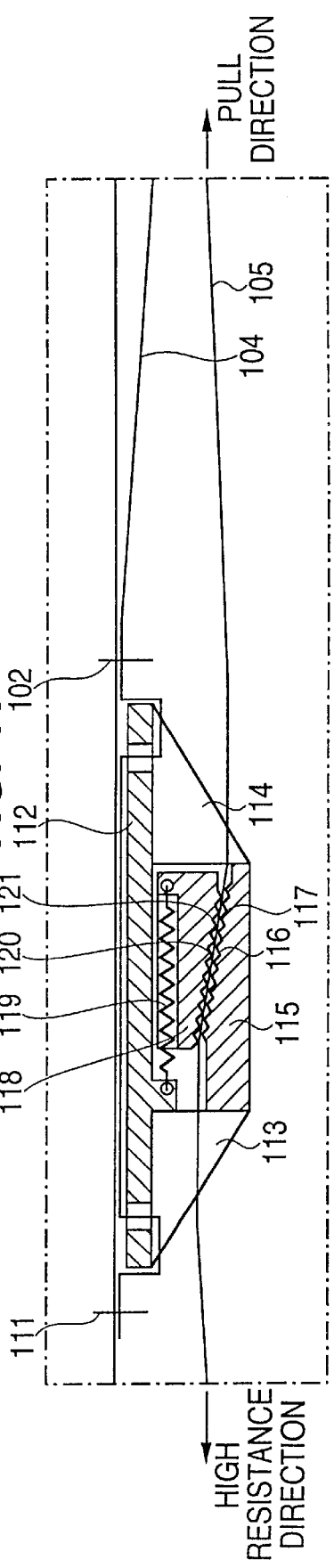
FIG. 16
FIG. 17

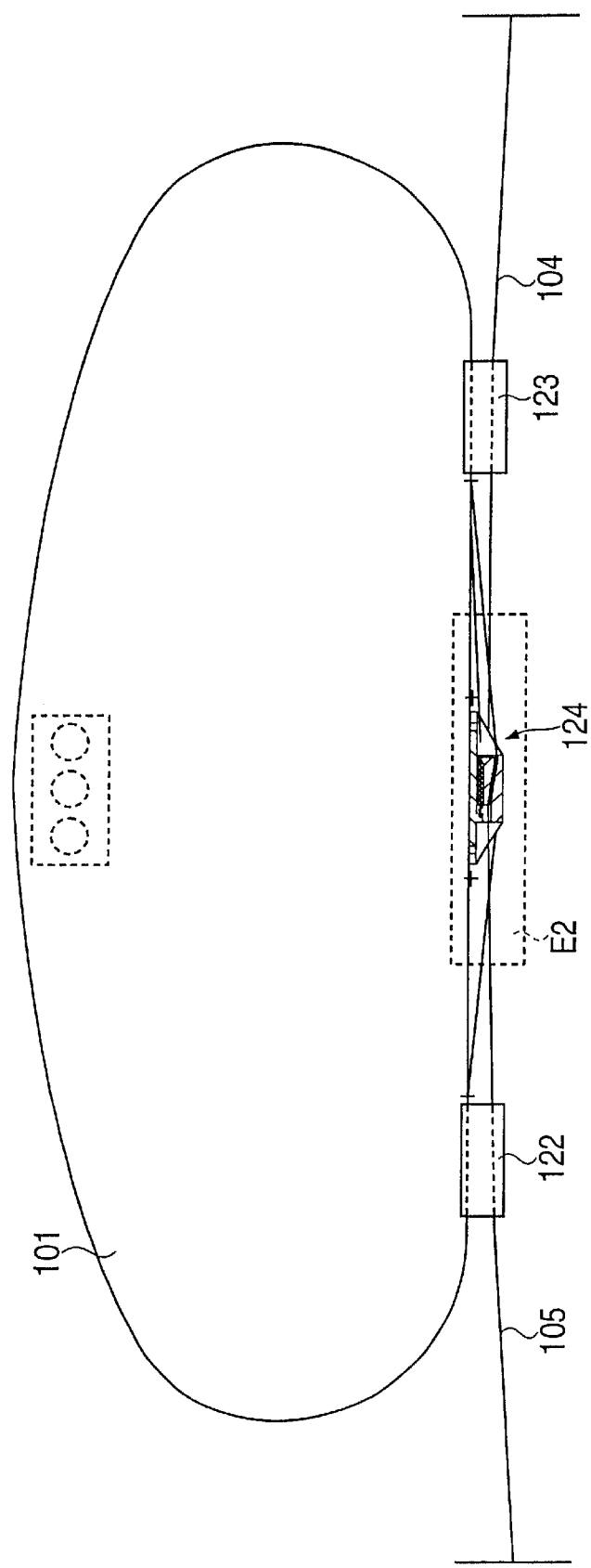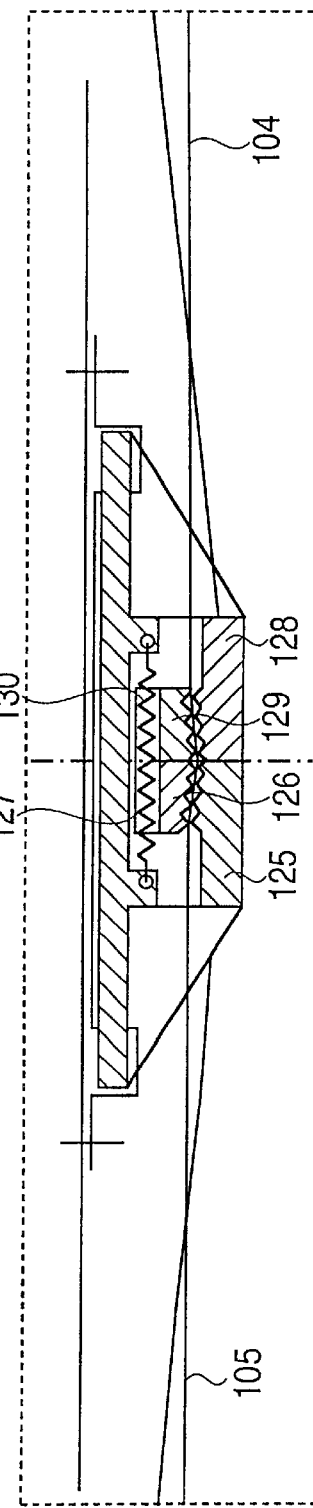

GAS BAG DEVICE WITH A TENSIONING CORD AND AUTOMOBILE THEREWITH

BACKGROUND OF THE INVENTION

Lateral airbags are known to protect the occupant of a vehicle in the event of lateral impact. Lateral airbags are provided for example in doors or in the side trims of the vehicle. These lateral airbags spread out and upwards in the event of a crash so that parts of the body lying level with the window are also protected.

The lateral airbags arranged in this way, however, are not suitable to protect the head of the occupant. Therefore airbags are known which are integrated in the vehicle seat. Thus a head restraint with integrated gas bag is known from DE 94 15 511.9 U1. This gas bag extends in the inflated state sideways from the head area and in the forward travel direction. The drawback with an airbag of this kind provided in the seat is that the sensor required for detonation of the gas generator has to be connected to the energy supply of the vehicle through a cable. Since vehicle seats are however in most cases movable and even removable these cables become in the way.

Therefore lateral airbags are also known which are mounted level with the head at the side in the vehicle. Here the gas bag extends between the A- and B-pillar or the B- and C-pillar of the vehicle. In the inflated state the gas bag covers the area of a side window. In the folded state the gas bag is stowed away above the window frame, i.e., it extends along a curve. In this curved position therefore the distance between the fastening points is greater than in the case where the gas bag runs straight in the inflated state. From this there is the need to tauten the gas bag or fastening sections of the gas bag in its inflated position.

To this end it is known from DE 195 19 297 to provide the gas bag on the A-pillar with a cable which runs over a tautening device. This has a guide pulley where the cable is deflected round 180°. The guide pulley is displaceable by means of a further mechanical device which is electronically controlled whereby the deflected part of the cable is extended and thus a tautening effect is achieved. This tautening device is operated during the inflation process. The drawback here is that a tautening device of this kind means extra mechanical and electronic expense.

Furthermore a lateral airbag is known from WO 94/19215 for protecting the head wherein this airbag likewise extends between two pillars of the vehicle, e.g., between the A and B pillars. The gas bag is tubular and consists of two crisscrossing threads with an elastic material extending inbetween. When the gas bag is not inflated but is stowed in this state above a vehicle window the threads lie practically parallel to each other. After inflation the threads rotate into the main unfolding direction of the gas bag. The diameter of the gas bag thereby increases whilst the length reduces. Thus a tautening effect likewise occurs without special additional mechanical or electronic aids. The drawback here, however, is that the gas bag has to be made from the said special material.

SUMMARY OF THE INVENTION

The object of the invention is to achieve a tautening action in an airbag, more particularly a lateral airbag, without additional mechanical devices and the electronics associated therewith and without having to use special material for the gas bag.

The present invention relates to an airbag, more particularly a lateral airbag with a tubular shape, which is connected to at least two points of the motor vehicle and in the non-inflated state is stored in a curved storage area. According to the invention at least one tensioning cord for shortening the unfolded gas bag is provided between the gas bag and a fastening point on the vehicle whereby the tensioning cord can be tautened through the inflating gas bag.

More particularly at least one tensioning cord is provided which is fixed at one end on the gas bag and at the other end on the vehicle whereby the fixing point on the gas bag can be moved together with the gas bag away from the cord's fixing point on the vehicle as the gas bag inflates.

Furthermore the invention can be designed so that the tensioning cord is fixed at one end to the gas bag and at the other end to the vehicle and that the tensioning cord has at least one guide point on the gas bag which during inflation of the gas bag can be moved away from the point of attachment of the tensioning cord on the gas bag.

With the airbag according to the invention, the movement of part of the gas bag and in particular a movement away from the point of attachment of the tensioning cord on the vehicle or on the gas bag during inflation of the gas bag is thus utilised to tauten the tensioning cord and thus the gas bag as it unfolds. The length of the tensioning cord can remain unchanged or can be shortened as the gas bag unfolds. The advantage of using the movement of the gas bag to tauten the cord is that no additional mechanical devices and associated electronics are required and that the gas bag can be made from conventional materials.

In a first embodiment, it is proposed that the gas bag is bottle-shaped and has inside a tensioning cord which is shorter than the gas bag and is connected at one end in the area of the bottle neck to the gas bag and at the other end in the non-inflated state of the gas bag to the inverted end of same which corresponds to the bottle base wherein the end of the tensioning cord is connected to the vehicle in the area of the bottle neck and the gas bag is connected to the vehicle in the area of its inflation mouth which is set at a distance from the bottle base.

With this embodiment, the distance between the fastening points of the gas bag at the inflation mouth and at the end of the bottle neck during inflation of the gas bag is reduced to the debit of the distance between the inflation mouth and the bottle base in that this distance is increased by the stretching of the gas bag while the bottle neck is simultaneously folded and thereby shortened.

The tensioning cord can both end at the bottle-shaped end of the gas bag and also extend beyond the gas bag and only there be connected to the vehicle.

In a second embodiment, at least one connecting cord or at least one contraction cord is provided which runs at least approximately in the main unfolding direction of the gas bag and is fixed on opposite parts of the gas bag, and the tensioning cord is fixed roughly in the middle of the connecting cord/contraction cord. The point of attachment of the tensioning cord on the connecting cord moves away from the fixing point of the tensioning cord on the gas bag as the gas bag inflates. The displacement path of the point of attachment thereby corresponds to the slack in the tensioning cord which is to be compensated.

It is expedient if the connecting cord is provided approximately in the center of the gas bag and is designed as a closed ring.

In a first design of this embodiment, the connecting cord runs inside the gas bag and the tensioning cord extends out from the gas bag and is connected to the gas bag at the point where it emerges from the same.

In a second design, the connecting and tensioning cords are provided outside of the gas bag and the tensioning cord is guided at the end of the gas bag between this and a shackle. With this design, the tensioning cord is thus not connected to the end of the gas bag but is guided round the same through the shackle.

In a further embodiment, it is proposed that the tensioning cords are formed at their fastening points with the gas bag as guide shackles for each other tensioning cord.

When using a contraction cord which acts similar to the connecting cord, the tensioning cord is connected to opposite ends of the gas bag. The contraction cord is attached to predefined points of the gas bag so that it gathers together individual sections of the gas bag during unfolding and in this way compensates for the slack in the tensioning cord.

In a third embodiment, the tensioning cord is guided at one end of the gas bag in a shackle and in its non-inflated state is connected to the other end of the gas bag which is folded towards the shackle. As the gas bag unfolds, the folded end of the gas bag moves away from the shackle and away from the fastening point of the tensioning cord on the vehicle and thereby transfers this movement to the tensioning cord.

In a further design of this embodiment, it is proposed that each tensioning cord has at least one return lock which prevents the tensioning cord from moving back against the unfolding direction of the gas bag but allows the tensioning cord to move in the unfolding direction of the gas bag and/or that at least one additional support shackle is provided for guiding the tensioning cord in the middle area of the gas bag which is likely to bend.

Providing a return lock or an additional tensioning cord support shackle prevents the tubular gas bag from bending in through the strain of the occupant once it has unfolded. The protection of the occupant would be impaired if the gas bag were to bend inwards.

In a preferred embodiment, the return lock is formed as a guide shackle and is fixed on the gas bag in place of a guide shackle.

Where two tensioning cords are provided, each tensioning cord has a return lock.

Where two tensioning cords are provided criss-crossing each other, it is expedient to provide one double return lock at the cross-over point.

In a preferred embodiment, the return lock has two relatively movable wedges wherein the tensioning cord runs between opposite wedge faces and these can be pressed against each other by at least one elastically deformable fastening means. During unfolding of the gas bag, the tensioning cords press the wedge faces away from each other against the force of the elastically deformable fastening means, and the tensioning cord is drawn along with the end of the gas bag to which it is fixed, and tautens the unfolded gas bag. As the gas escapes from the gas bag at the end of the unfolding process, the wedge faces are pressed against each other under the action of the elastically deformable fastening means. The tensioning cord is thereby fixed at this point. The tensioning cord thereby remains tensioned between its fastening point on the motor vehicle and the wedge faces even if the gas bag collapses as a result of the escaping gas. This substantially prevents the gas bag from bending inwards.

It is expedient if one wedge is arranged fixed while the other wedge is displaceable relative to the fixed wedge and has the elastically deformable fastening means. As elastically deformable fastening means, a draw spring can be provided whose active direction runs substantially opposite the traction direction of the tensioning cord during unfolding of the gas bag.

To increase the clamping action of the wedge faces, it is expedient if the opposing wedge faces have grooves which run at least approximately cross-wise to the direction of movement of the tensioning cord.

In a further design, it is proposed that at least one additional support shackle is provided between the guide shackles or return locks provided at the ends of the gas bag. Where return locks are used, this support shackle represents an additional means for preventing the gas bag from bending in. In the event that guide shackles are used in place of return locks, the support shackle is the sole means for preventing the gas bag from bending in.

In one embodiment, the tensioning cord is guided on the gas bag and in the non-inflated state is connected to the other end of the gas bag which has been folded towards the fastening point on the vehicle.

In a fourth embodiment, the tensioning cord is connected to the gas bag at the site where the gas bag changes shape the most during inflation and is guided from there towards the end of the gas bag in at least one shackle. It is expedient if the site of the greatest change of shape is formed by a peak-like irregularity in the contour of the gas bag which can be provided as an indent or bulge in the gas bag. In the folded state, the shackles, as well as the fastening point of the tensioning cord on the vehicle, are mounted substantially along a straight line. During unfolding, the tensioning cord is drawn along as a result of the irregular airbag contour through the shackles in the direction of the fastening point of the tensioning cord on the gas bag and the slack in the tensioning cord is thereby compensated.

In a fifth embodiment, the gas bag is fixed in the area of its inflation mouth on the vehicle and extends to each side of the inflation mouth. The tensioning cord is fixed at one end inside the gas bag and with its other end runs out of the gas bag where it is connected to the vehicle outside of the gas bag. For assembly, the gas bag is gathered up in the area next to the inflation mouth which is remote from the fastening point of the tensioning cord on the vehicle. During unfolding of the gas bag, the gathered gas bag material expands and thereby draws in a corresponding piece of the tensioning cord. The tensioning cord can in this embodiment be guided to the outside from the gas bag through an outlet opening, valve opening or through the fabric of the gas bag.

In a sixth embodiment, a gas bag which during folding has been wound up through rotation about the unfolding axis is connected to the tensioning cord on the outside by at least one section which is opposite the fastening point of the tensioning cord on the vehicle. During unfolding the gas bag spreads out in the direction of the useful position and thus in the direction of the fastening point of the tensioning cord on the vehicle. At the same time the gas bag turns back into its original alignment and the slack of the tensioning cord winds up over the circumference of the gas bag.

In one embodiment two tensioning cords are provided of which each one is connected to the vehicle in the area of one end of two opposite ends of the gas bag.

The tensioning cords can be substantially non-deformable, but can however also be made from elastically deformable material.

The invention will now be explained with reference to the embodiments shown in the drawings.

DESCRIPTION OF THE DRAWINGS

FIG. 4d shows a variation of the gas bag with the inflation mouth at the narrow end of the gas bag;

FIGS. 8a, b show an embodiment wherein a tensioning cord connected at one end to the gas bag forms a guide shackle;

FIGS. 9a, b show an embodiment wherein each tensioning cord is guided loose at one end of the gas bag and is fixed at its other end, in the folded and unfolded positions;

FIGS. 10a, b show an embodiment with an inwardly bulging gas bag;

FIGS. 11a, b show an embodiment with a specially guided tensioning cord;

FIG. 16 shows a gas bag in the inflated state which has a return lock at opposite ends for each tensioning cord;

FIG. 17 shows a section on an enlarged scale through a return lock according to the detail E1 of FIG. 16;

FIG. 18 shows a gas bag in the inflated state which has a double return lock;

FIG. 19 shows an enlarged sectional view through the double return lock according to the detail E2 of FIG. 18.

DETAILED DESCRIPTION OF THE INVENTION

Figure 1A:
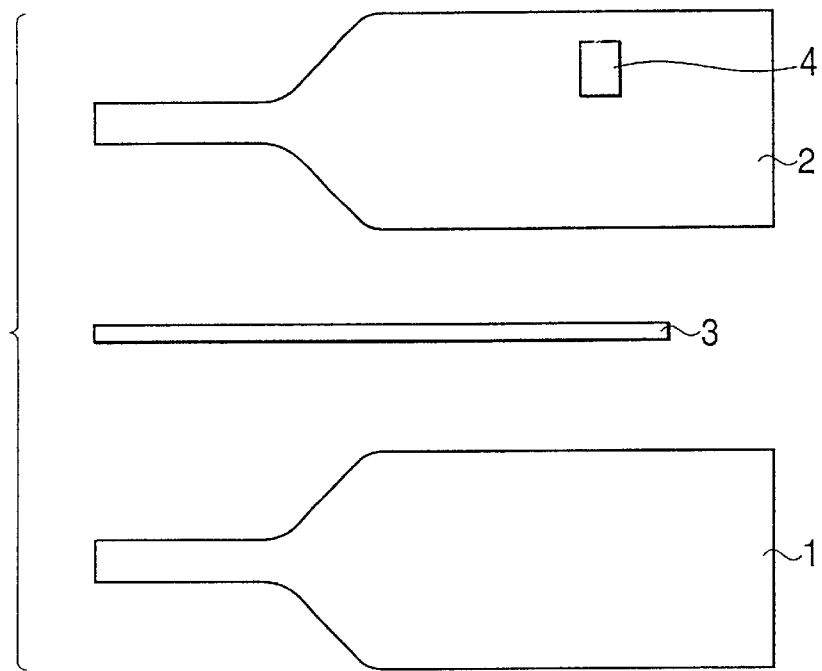
FIGS. 1*a–c* show the principal construction of a bottle-shaped bag.
Figure 1B:
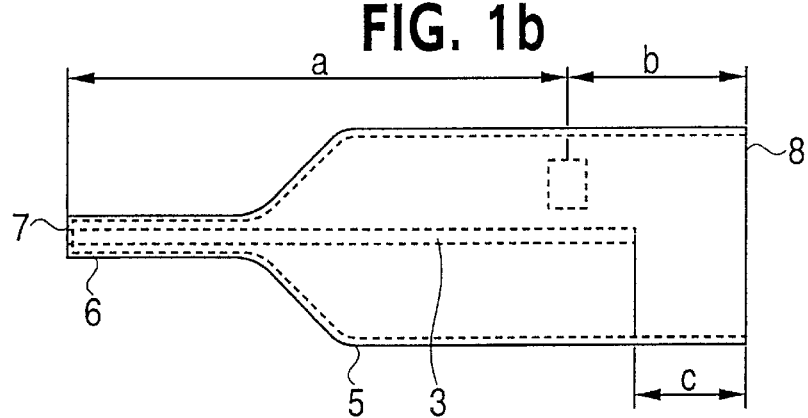
Figure 1C:
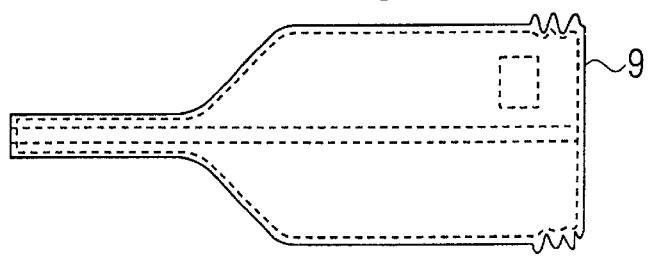

The gas bag illustrated in FIGS. 1a to 1c has a bottle shape and is comprised of an upper plate 1 and a lower plate 2 between which is provided a tensioning cord 3 which has a shorter length than the gas bag. In the lower plate 2 is an inflation mouth 4 to which an inflation device (not shown) can be attached. The upper and lower plates 1, 2 are connected together by a seam 5. The tensioning cord 3 is connected at one end by a seam 7 to the end of the bottle neck 6. The bottle base 8 is then inverted until the outer edge of the gas bag can be stitched to the second end of the tensioning cord. The upper and lower plates are thereby also stitched by a seam 9 to this side of the gas bag.

Figure 2A:
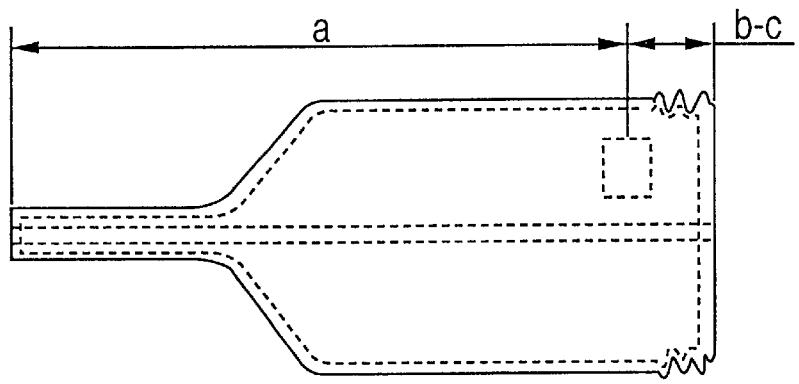
FIGS. 2a, b show the gas bag according to FIGS. 1a–c in the folded and unfolded positions.

The gas bag is connected by its inflation mouth area 4 to the vehicle and the tensioning cord 3 is connected to the gas bag at the end of the bottle neck 6. The distance a exists between the two. The gas bag has the length b to the right of the inflation mouth 4 in the unstitched state. The tensioning cord 3 ends at a distance c from the unstitched right end of the gas bag. After inverting and stitching the bottle base 8 its distance from the inflation mouth 4 is reduced by the distance c (FIG. 2a).

Figure 2B:
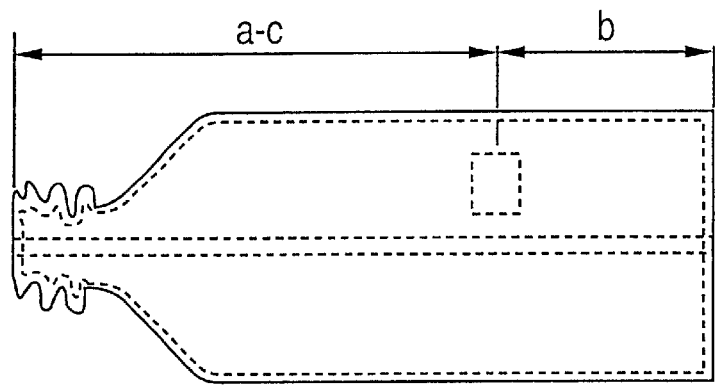

When the gas bag inflates it cannot expand completely since the tensioning cord inside the gas bag restricts the expansion of the gas bag. As a result of the larger cross-sectional surface of the wide gas bag part opposite the bottle neck 6 and the greater force arising therefrom in the wider gas bag part, as the internal pressure rises, so the wider gas bag part is extended up to reaching the distance b (FIG. 2b) to the debit of the distance a which is reduced by the value c.

Figure 3:
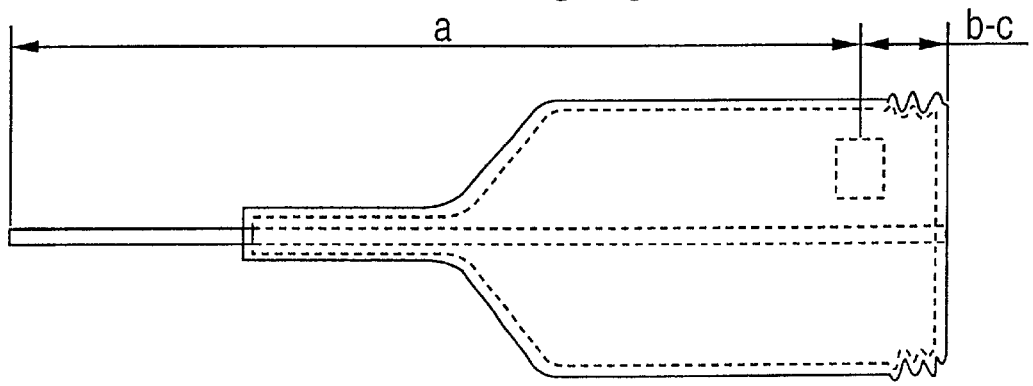
FIG. 3 shows a variation of the gas bag according to FIGS. 1a–c.
Figure 4A:
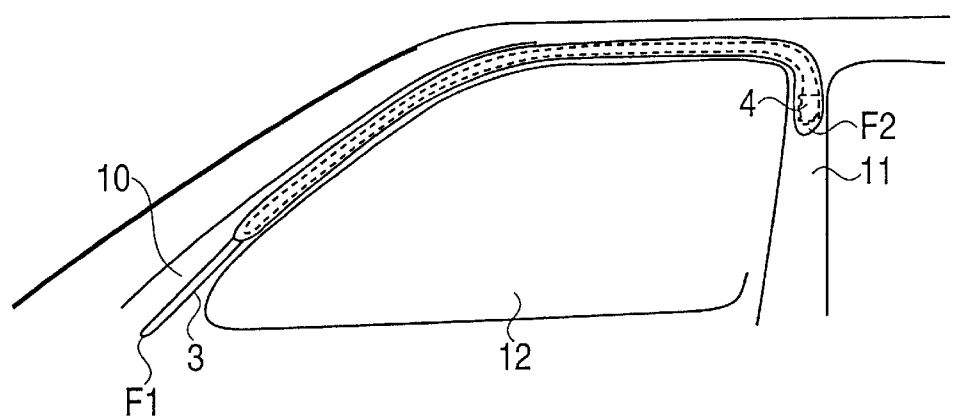
FIGS. 4a–c show the gas bag according to FIG. 3 fitted in a vehicle in the folded and unfolded positions.

The same effect is achieved if the tensioning cord is extended beyond the bottle neck as shown in FIG. 3. This embodiment is shown in the installed position in FIGS. 4a to 4c. The end of the tensioning cord projecting out of the gas bag is connected to the A-pillar 10 of the vehicle at its fastening point F1. On the other side, the gas bag is connected by a fastening point F2 to the vehicle by its inflation mouth 4 in the area of the B-pillar 11. As can be seen in FIG. 4a the gas bag is stowed in the folded state above the window 12 along the roof bar. Owing to the curved storage area, the gas bag extends with the tensioning cord over a greater length than the straight connecting line between the fastening points F1 and F2. This embodiment is shown in the installed position in FIGS. 4a to 4c The end of the tensioning cord projecting out of the gas bag is connected to the A-pillar 10 of the vehicle at its fastening point F1. On the other side, the gas bag is connected by a fastening point F2 to the vehicle by its inflation mouth 4 in the area of the B-pillar 11. As can be seen in FIG., 4a the gas bag is stowed in the folded state above the window 12 along the roof bar. Owing to the curved storage area, the gas bag extends with the tensioning cord over a greater length than the straight connecting line between the fastening points F1 and F2.

Figure 4B:
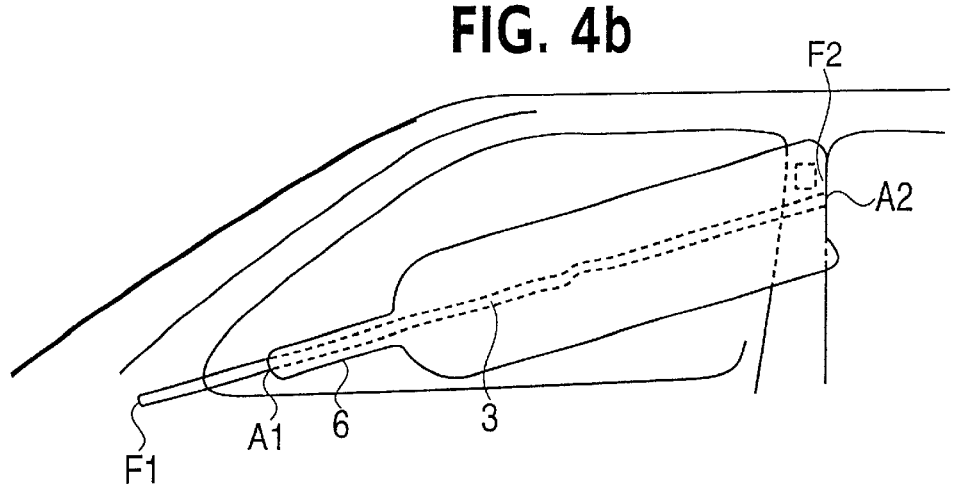
Figure 4C:
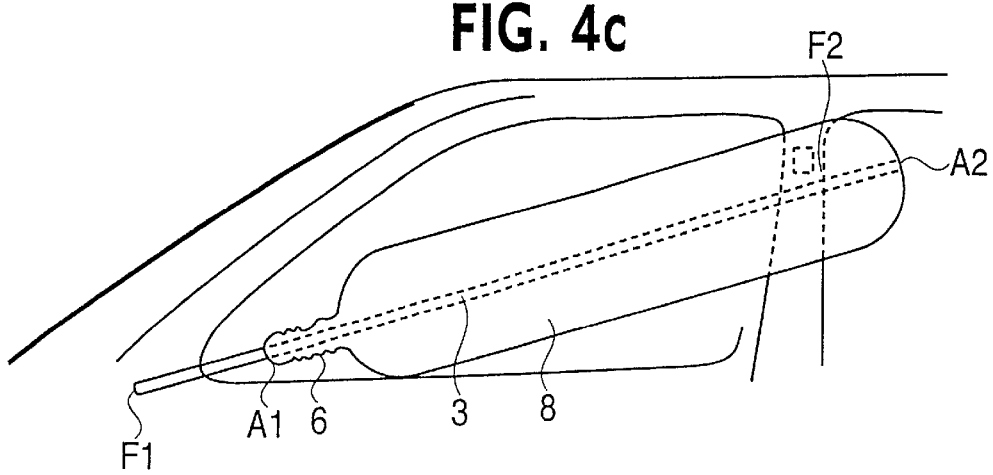

When propellant gas flows into the folded gas bag after the cover (not shown) has been ripped open, the gas bag is unfolded into the inside of the vehicle as shown in FIG. 4b. The gas bag thereby first extends more loosely between the fastening points F1 and F2 and the tensioning cord 3 likewise loosely in the gas bag as can be seen from FIG. 4b. As the pressure in the gas bag increases, a greater force engages on an engagement point A2 than on an engagement point A1 at the bottle neck so that A2 moves away outwards from the fastening point F2 at the inflation mouth 4 and the movement is transferred through the tensioning cord 3 to A2. The bottle neck 6 is gathered as a result of the adjusting force equilibrium and the shortening resulting therefrom (FIG. 4c) so that the gas bag is tensioned taut between the fastening points F1 and F2. Through the displacement of the engagement point A2 to the right, the tensioning cord between the fastening points F1 and F2 is quasi shortened.

A further variation is shown in FIG. 4d in the inflated state. With this variation the inflation mouth 4 is located at the narrow gas bag end. The gas bag is connected to the A-pillar 10 at fastening point F1 and to the B-column 11 at the fastening point F2. The tautening strip 3 is connected to the gas bag on one side at the engagement point A1 in the bottle neck 6 and on the other side at the engagement point A2. The method of action corresponds to the embodiment of FIGS. 4a to 4c.

Figure 5A:
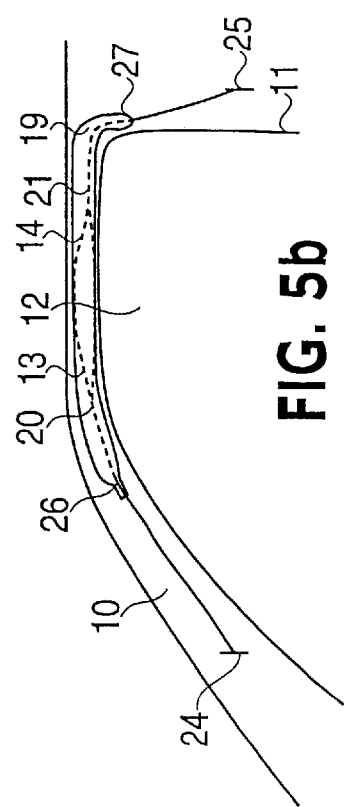
FIGS. 5a–c show an embodiment with two connecting cords mounted in the gas bag in the folded and unfolded positions.
Figure 5B:
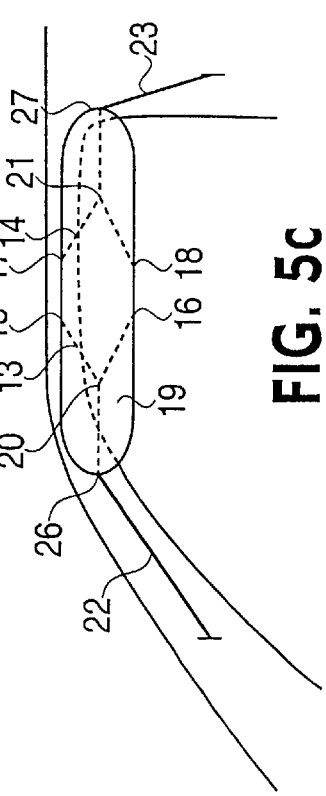
Figure 5C:
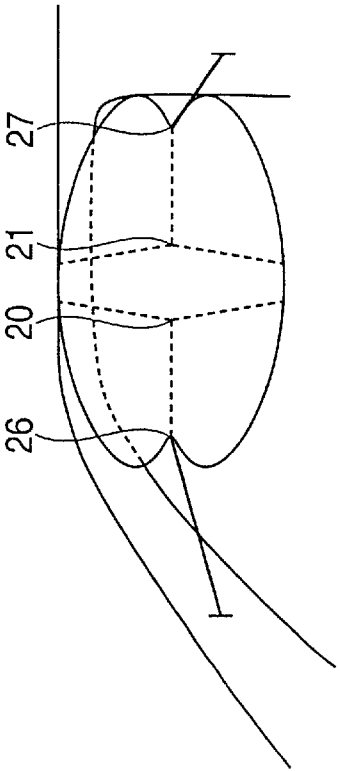

With the embodiment of FIGS. 5a to 5c two connecting cords 13, 14 are provided inside the gas bag 19 and are fixed on parts 15, 16 and 17, 18 of the gas bag 19 which are opposite one another in the main unfolding direction. Tensioning cords 22, 23 are fixed in the middle between the fastening points on the gas bag to the connecting cords at the fastening points 20, 21. These tensioning cords extend through two opposite ends of the gas bag which are closest to the fastening points 24, 25 of the tensioning cords on the vehicle side. These ends are formed as imprinted projections 26, 27 of the gas bag and the tensioning cords are connected, e.g. stitched, there to the gas bag. Therefore the length of the tensioning cords remains constant between the points 24 and 26 or 25 and 27 on one side and between the points 20 and 26 or 21 and 27 during unfolding of the gas bag.

FIG. 5a shows the gas bag first in the folded state above the window 12 wherein the fastening point 24 is on the A pillar 10 and the fastening point 25 is on the B pillar 11 of the vehicle. In this position the connecting cords 13, 14 extend in the direction of the fastening points 24, 25.

During inflation of the gas bag, the connecting cords 13, 14 are stretched in the main unfolding direction whereby the fastening points 20, 21 of the tensioning cords 22, 23 are moved away from the fastening points 24, 25. The projections 26, 27 of the gas bag are thereby stretched at first (FIG. 5b) and with full unfolding of the gas bag are inverted into the gas bag (FIG. 5c). Where the gas bag is designed without projections, the gas bag would be inverted to a greater extent. Through the depicted displacement of the fastening points 20, 21, the gas bag is tautened in the unfolded position by means of the tensioning cords.

Figure 6A:
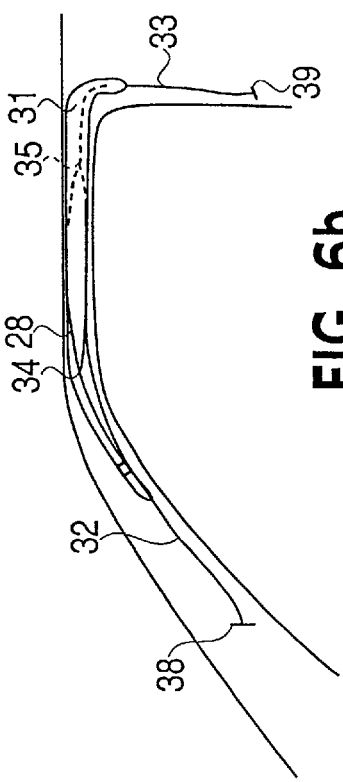
FIGS. 6a, b show an embodiment with a connecting cord mounted outside of the gas bag in the folded and unfolded positions.
Figure 6B:
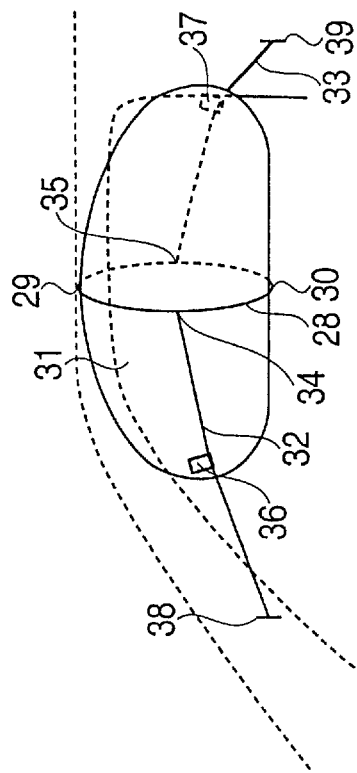

With the embodiment of FIGS. 6a and 6b, a closed ring 28 is provided as a connecting cord outside of the gas bag and around the same. A ring of this kind could also be provided inside the gas bag as a connecting cord. This ring is connected to the gas bag 31 at fastening points 29, 30. Tensioning cords 32, 33 are fixed offset 90° to the ring 28 on opposite points 34, 35. The tensioning cords are guided on opposite ends of the gas bag in shackles 36, 37 and are connected to the vehicle at fastening points 38, 39.

As can be seen from FIG. 6a the fastening points 34, 35 in the folded state of the gas bag face towards the fastening points 38, 39. During inflation the fastening points 34, 35 of the tensioning cords are moved away from their fastening points 38, 39 on the vehicle whereby the gas bag is tautened in the inflated state.

Figure 7A:
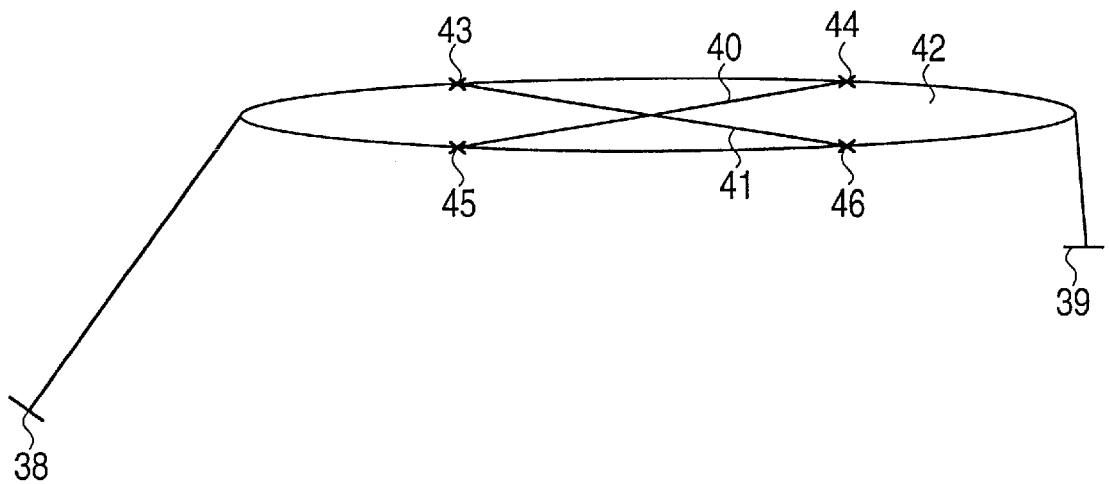
FIGS. 7a, b show side views of an embodiment with criss-crossing contraction cords in the folded and unfolded positions.
Figure 7B:
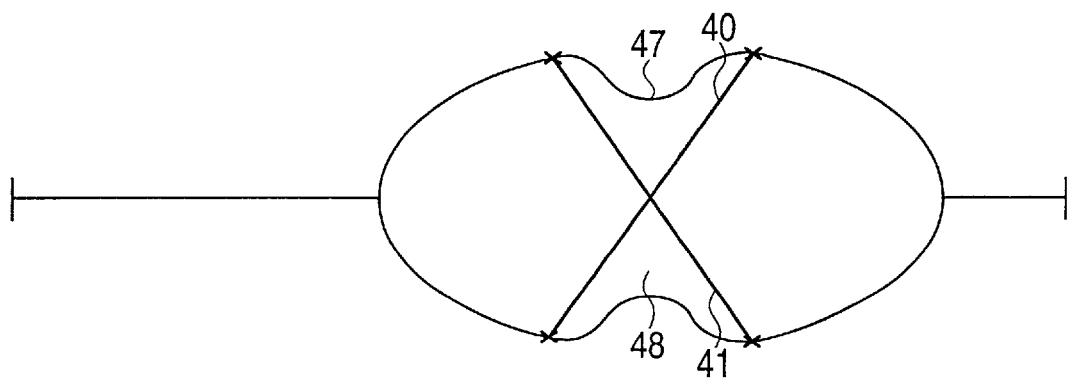
FIG. 7c shows a plan view of the embodiment of FIGS. 7a, 7b.

FIGS. 7a and 7b show an embodiment with criss-crossing contraction cords 40, 41 which are connected to the gas bag 42 to fastening points 43, 44, 45, 46 inside same. The contraction cords gather up individual sections 47, 48 of the gas bag as it unfolds whereby the slack of the tensioning cords which are fixed on the vehicle at fastening pints 38, 39 is compensated.

Figure 7C:
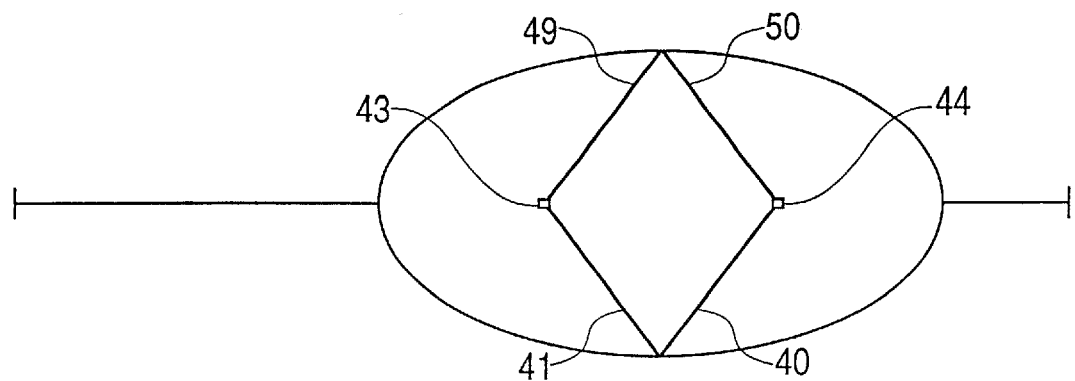

The plan view of FIG. 7b shown in FIG. 7c shows the section of the contraction cords 40, 41 running on the upper side of the gas bag 42 as well as the section of the contraction cords 49, 50 which runs on the upper side. The latter cannot be seen from the side views of FIGS. 7a and 7b since only one side of the gas bag is shown there.

Figure 8C:
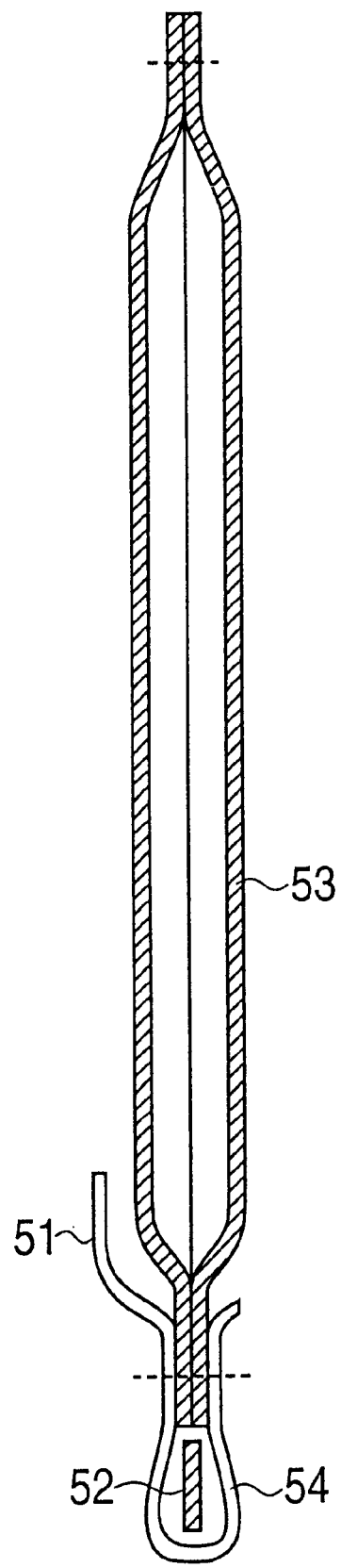
FIG. 8c shows a section through FIG. 8a in the direction of the arrow VIII—VIII on an enlarged scale.

In the embodiment of FIGS. 8a to 8c, two tensioning cords 51, 52 are provided outside of the gas bag 53. These are fixed at one end on the vehicle and at the other end on the gas bag in the form of shackles 54, 55. One tensioning cord runs in each shackle of the other tensioning cord, i.e., the tensioning cord 52 runs in the shackle of the tensioning cord 51 and vice versa. In FIG. 8a, the gas bag 53 is shown in the folded position. During unfolding of the gas bag as a result of the gas emerging from the gas generator 53a, the tensioning cords 51, 52 are drawn along and deflected through the shackles 54, 55 until in the inflated state of the gas bag the position of the tensioning cords is reached as shown in FIG. 8b. The path of the tensioning cord 52 in the shackle 54 can be seen from the sectional view of FIG. 8c.

Also, with the embodiment of FIGS. 9a and 9b, two tensioning cords 56, 57 are provided outside of the gas bag 60 and are guided through shackles 58, 59 at one end of the gas bag to opposite ends 61, 62 of the gas bag. The ends 61, 62 are, in the folded state of the gas bag, folded in the direction of the fastening point of the relevant tensioning cord on the vehicle, as can be seen from FIG. 9a. During unfolding of the gas bag, the ends 61, 62 are removed from the fastening point of the relevant tensioning cord. The movement of the gas bag during unfolding is transferred to the tensioning cords which are deflected round by means of the relevant shackles 58, 59 to the fastening points 38, 39 on the vehicle side.

In the embodiment of FIGS. 10a and 10b, a gas bag 63 is provided which bulges inwards on one side in the unfolded state. With this embodiment, a tensioning cord 64 is provided which is connected to the gas bag at the most heavily curved area 65. On either side of this connecting point, the tensioning cord is guided in the shackles 66 to 69 up to the fastening points 38, 39 on the vehicle. In the folded state, as shown in FIG. 10a, the shackles as well as the area 65 of the gas bag, lie substantially in a straight line. During unfolding the tensioning cord is drawn as a result of the inward curvature of the gas bag through the shackles in the direction of the area 65 and thereby compensates the slack in the tensioning cord.

With the embodiment of FIGS. 11a and 11b, the active mechanism is similar to that in the embodiment of FIGS. 10a and 10b. A gas bag 70 is provided which is connected to the vehicle at its area of maximum shape change during inflation. A tensioning cord 72 is also fixed there outside on the gas bag and is guided at inclined opposite points of the gas bag through shackles 73, 74 to the fastening areas 38, 39 on the vehicle. In the folded state of the gas bag, the tensioning cord runs between the shackles 73 and 74 substantially along a straight line. During unfolding, the shackles 73, 74 move away from the point 71 whereby the tensioning cord is drawn through the shackles towards the point 71 so that the slack in the tensioning cord is compensated.

Figure 12A:
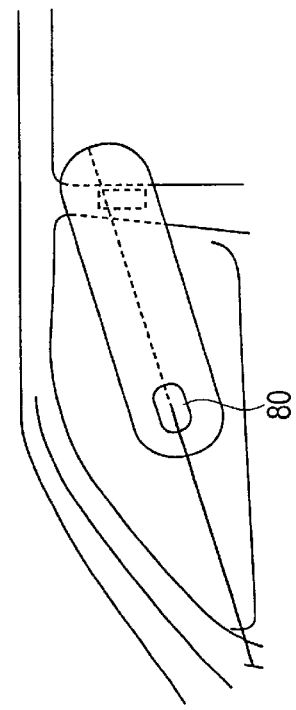
FIGS. 12a–c show an embodiment with a gas bag fixed at its inflation mouth on the vehicle, and a tensioning cord which is fixed at one end on the vehicle and at the other end in the gas bag at its end on the other side of the inflation mouth.
Figure 12B:
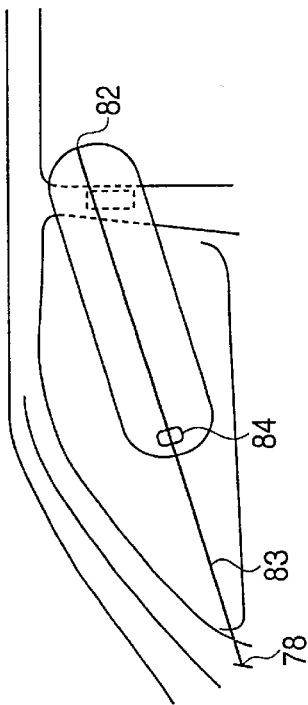
Figure 12C:
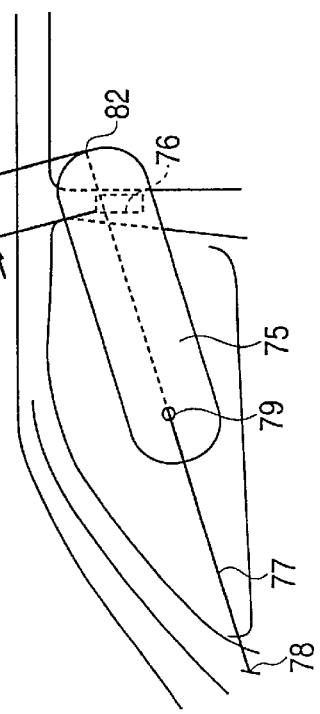

With the embodiments of FIGS. 12a to 12c, a gas bag 75 is fixed around its inflation mouth area 76 to the B-pillar of the vehicle whereby the tubular gas bag extends in the direction of its center line on either side of the inflation mouth. The gas bag is associated with a tensioning cord 77 which is fixed by one end 78 to the A pillar of the vehicle. The tensioning cord enters into the gas bag at one end and is connected to the gas bag at the other end 82 on the other side of the inflation mouth. As with the embodiment of FIGS. 1 and 2, a minimum spacing b is provided between this end 82 and the inflation mouth 76. The point of entry can be formed by a penetration point 79 (FIG. 12a) through which the tensioning cord is rammed. The point of entry can however also be formed by an outflow opening 80 (FIG. 12b) or a valve 81 (FIG. 12c).

For fitting, the minimum distance b of the gas bag end is gathered up. During unfolding of the gas bag the gathered gas bag material expands and thereby draws a corresponding piece of the tensioning cord into the gas bag whereby the tautening of the tensioning cord takes place as shown in FIGS. 12a to 12c.

Figure 12D:
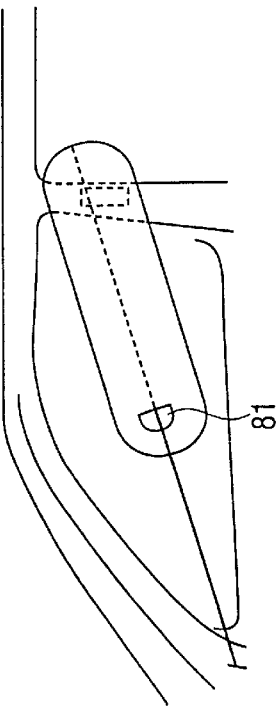
FIG. 12d shows an embodiment with a gas bag fixed at its inflation mouth on the vehicle, and a tensioning cord fixed outside on the gas bag.

In the embodiment of FIG. 12d a tensioning cord 83 runs out along the gas bag starting from its end 78 which is fixed on the A pillar. The tensioning cord is thereby guided at one end of the gas bag in a shackle 84 and at the other end of the gas bag is fixed outside on the gas bag by its end 82. The method of operation corresponds. to the embodiments of FIGS. 12a to 12c.

Figure 13A:
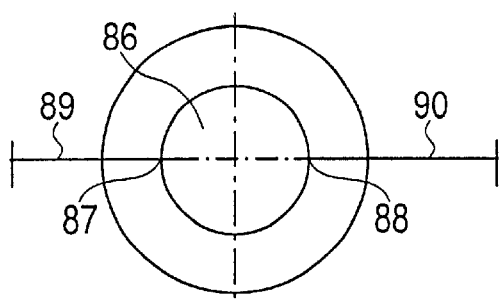
FIGS. 13a, b show diagrammatically a gas bag folded by inward rotation and with tensioning cords.
Figure 13B:
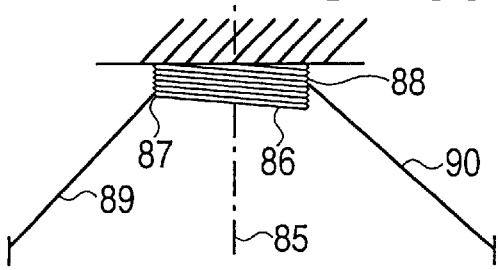

With the embodiment of FIGS. 13 to 15, a rotation of the gas bag about an unfolding axis during folding is used to tauten the gas bag. The principle is explained in FIGS. 13a, 13b and 14a to 14d. FIG. 13b shows a side view of the gas bag 86 turned about the unfolding axis 85. In this folded position, tensioning cords 89, 90 extend freely away from the gas bag away from the fastening points 87, 88 of the gas bag, as shown in particular in FIG. 13a. The tensioning cords 89, 90 run, in this embodiment in the folded position of the gas bag 86, from the fastening points 87, 88 in plan view (FIG. 13a) in the radial direction and in side view (FIG. 13b) inclined to the unfolding axis 85.

Figure 14A:
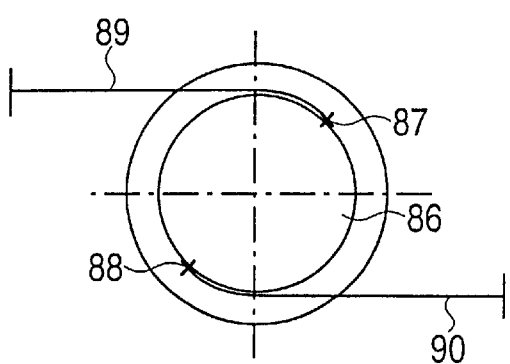
FIGS. 14a, 14b show the gas bag according to FIGS. 13a, b after partial unfolding.
Figure 14B:
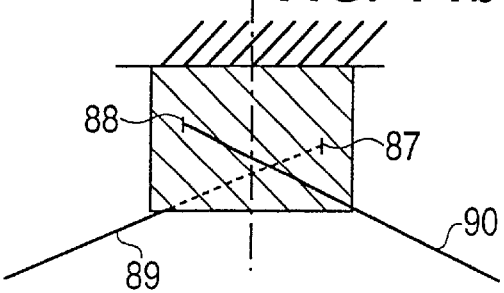
Figure 14C:
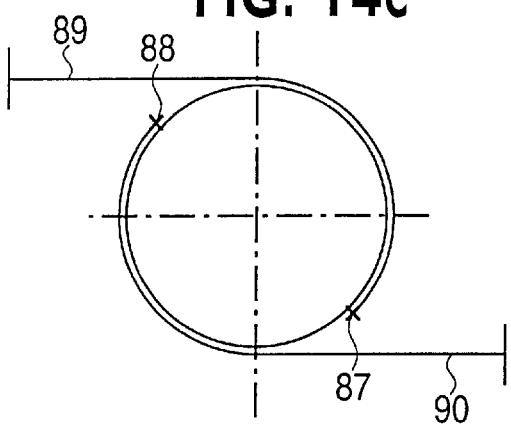
FIGS. 14c, d show the gas bag according to FIGS. 13a, b in the unfolded state.
Figure 14D:
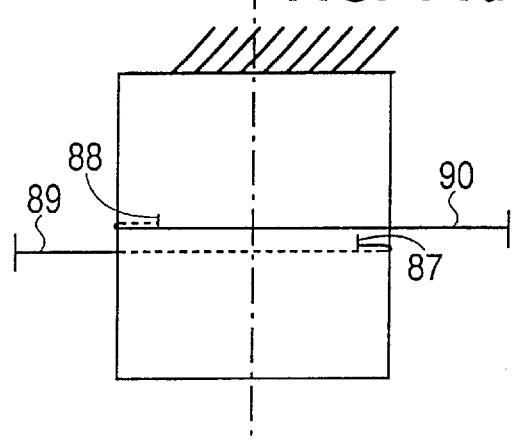

During unfolding of the gas bag, the gas bag turns back into its original position. The slack of the tensioning cords is thereby wound up on the gas bag as can be seen from FIGS. 14a to 14d. The tensioning cords are in this embodiment thus torsion cords. It can be seen that the gas bag during unfolding spreads out both in the direction of the unfolding axis 85 and crosswise relative to same. FIGS. 14c and 14d show the fully unfolded gas bag.

Figure 15A:
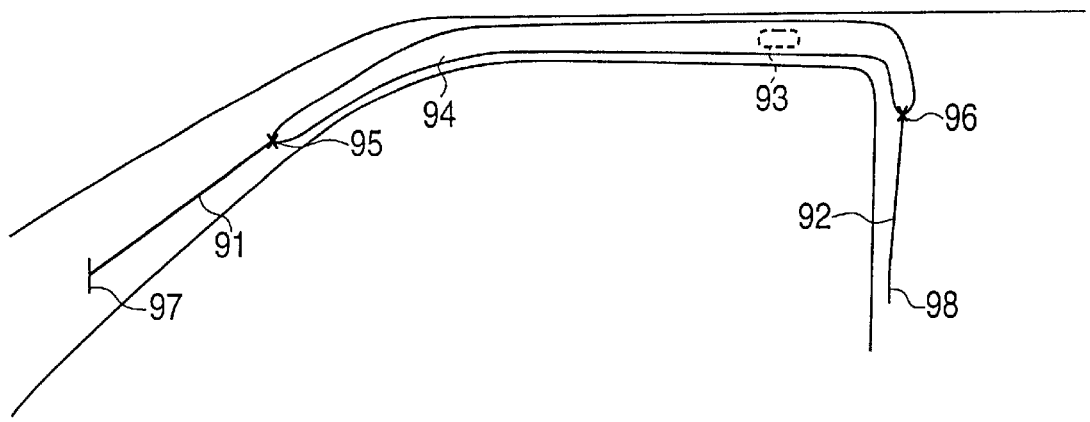
FIGS. 15a–c show diagrammatically a gas bag installed in the vehicle according to the active principle of FIGS. 13 and 14 in various unfolding positions.
Figure 15B:
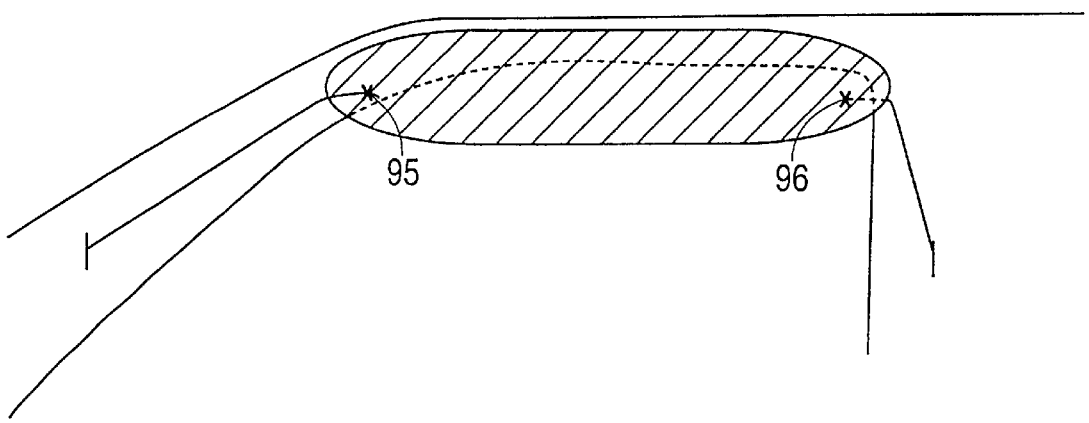
Figure 15C:
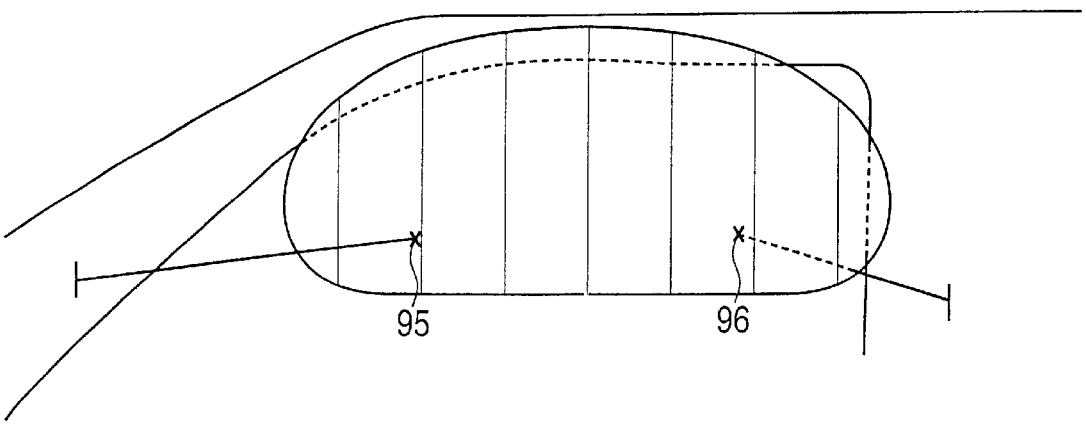

FIGS. 15a–15c show the unfolding phases of a further embodiment of the gas bag with torsion cords. The tensioning cords 91, 92 extend left and right of the inflation mouth 93 of the gas bag 94. The gas bag includes an upper and lower plate wherein the tensioning cord 91 is fixed on the lower plate at the fastening point 95 and the tensioning cord 92 is fixed on the upper plate at the fastening point 96. Furthermore the tensioning cords are connected to the vehicle at the fastening points 97, 98. In FIG. 15a, the gas bag is shown in the folded and thereby turned-in state. In FIG. 15b the gas bag is partially unfolded. During unfolding, the gas bag has spread out in the direction of the fastening points of the tensioning cords on the vehicle side. At the same time the gas bag is turned back into its original orientation and winds up the slack of the tensioning cords over the circumference. FIG. 15c shows the gas bag in the fully unfolded state.

FIG. 16 shows a gas bag 101 in the inflated state. Tensioning cords 104 and 105 are fixed on the gas bag at fastening points 102 and 103 and are connected by their other ends at fastening points 106 and 107 to the vehicle. Each tensioning cord 104 and 105 is associated with a return lock 108 and 109 respectively in the area of the ends of the gas bag. A support shackle 110 is associated with both tensioning cords and is fixed on the gas bag between the return locks. Thus the tensioning cord 104 thus runs from the fastening point 106 on the vehicle over the return lock 108 and the support shackle 110 to the fastening point 102 on the gas bag. The tensioning cord 105 runs from a fastening point 107 on the vehicle opposite the fastening point 106 over the return lock 109 and the support shackle 110 to the fastening point 103 on the gas bag.

FIG. 17 shows the return lock 109 on an enlarged scale. It is fixed on the gas bag 101 at the fastening point 102 together with the tensioning cord 104 and is further connected to same at a fastening point 111. The return lock has a base body 112 with webs 113, 114 on which a wedge 115 is fixed. The wedge face 116 is provided with grooves 117 running across the pull direction of the tensioning cord 105. A movable wedge 118 is associated with the fixed wedge 115. This is connected to the base body 112 through a draw spring 119 and the draw spring runs in the pull direction of the tensioning cord 105. The wedge face 120 of the wedge 118 likewise has grooves 121 running across the pull direction of the tensioning cord 105.

In the folded state of the gas bag (not shown) in which this occupies a curved position for example above a door frame, the sections of the tensioning cords 104 and 105 provided between the fastening points 106, 107 and the associated return locks 108 and 109, respectively, are longer than in the unfolded state of the gas bag shown in FIG. 16. The relevant section of the tensioning cords between the return lock and the fastening points 102 and 103 is correspondingly shorter.

The method of functioning of the return locks will be explained with reference to the return lock 109. During unfolding of the gas bag, the tensioning cord 105 connected to the gas bag at the fastening point 103 is drawn as a result of this part of the gas bag spreading out to the right into the pull direction shown in FIG. 17 through the return lock. This is possible since through the action of the tensioning cord 105, the movable wedge 118 is moved away from the fixed wedge 115 against the action of the draw spring 119. The return lock acts in this phase as a guide shackle. If immediately after unfolding, the gas bag collapses as a result of the gas escaping, then the tensioning cord 105 is relaxed. The movable wedge 118 is then pressed by the draw spring 119 against the fixed wedge 115 and clamps the tensioning cord 105 between its wedge faces 116 and 120. This action is assisted by the grooves 117 and 121. If instead of the return lock only a guide shackle were to be provided, then in the relaxation phase of the gas bag, as a result of the displacement of the fastening point 103 of the tensioning cord 105 to the left, the section of the tensioning cord 105 between its fastening point 107 on the vehicle and the guide shackle could be extended again. The danger would then arise of the gas bag bending in upwards and thus the danger that the gas bag no longer protects the body of the occupant.

This action which is described for the return lock 109 also occurs for the return lock 108 for the tensioning cord 104 and thus for the other side of the gas bag 101.

The bending in of the gas bag is additionally prevented by the support shackle 110 which is located in the middle of the gas bag, i.e., at the site where the gas bag is most likely to bend in.

A further embodiment of the invention is shown in FIGS. 18 and 19. There guide shackles 122 and 123 are provided in place of the return locks. A double return lock 124 is attached to the gas bag 101 between these shackles. This double return lock has pairs of wedges arranged side by side. Thus a fixed wedge 125, a movable wedge 126 and a draw spring 127 are provided for the tensioning cord 105. Next to this pair of wedges, i.e., in FIG. 19 behind the firstmentioned pair of wedges in the viewing direction, a fixed wedge 128, a movable wedge 129 and a draw spring 130 are provided for the tensioning cord 104. The method of operation of the double return lock corresponds to the method of operation previously described for the return locks 108 and 109.

Figure 20:
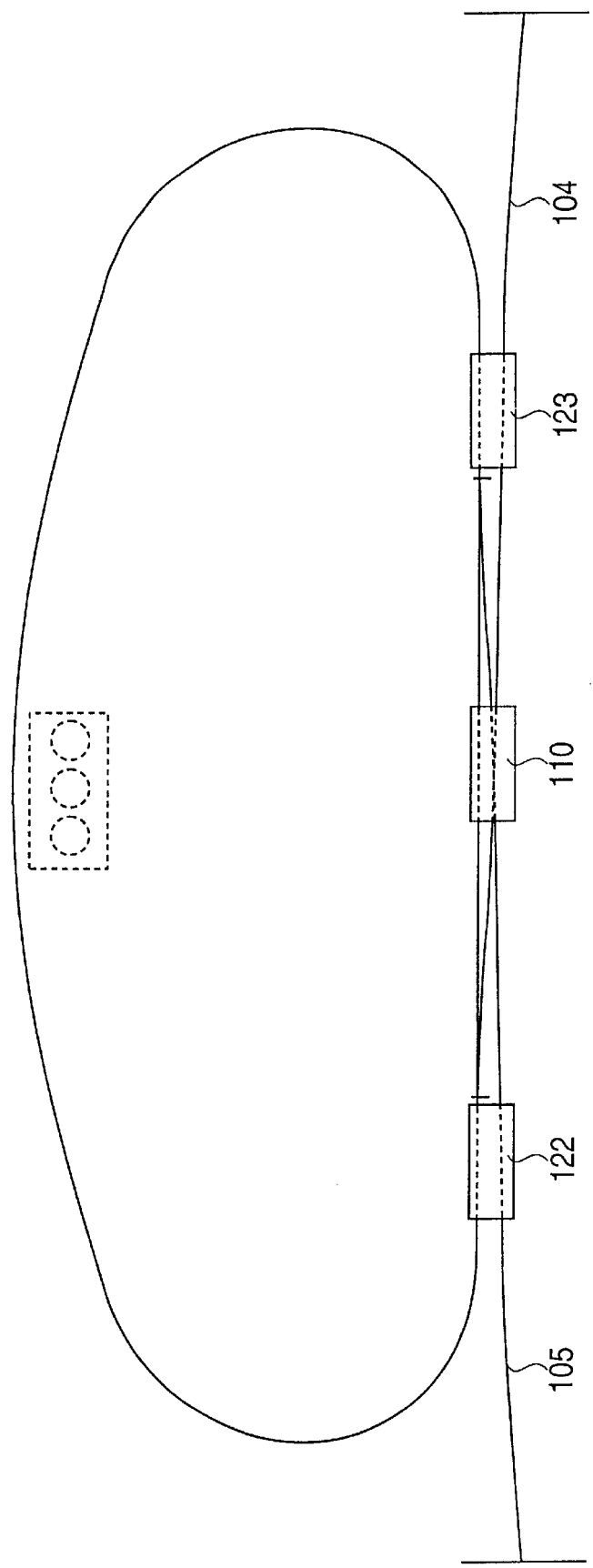
FIG. 20 shows a gas bag in the inflated state with two guide and one support shackles.

Bending in of the gas bag can also be prevented to a certain extent if a support shackle 110 is provided between two guide shackles 122 and 123, as shown in FIG. 20. The two tensioning cords 104 and 105 run through this.

What is claimed is:

1. A gas bag arrangement for a vehicle having a curved storage area and first and second anchoring points located on a side structure of the vehicle, comprising:
   a gas bag stored in the curved storage area in a non-inflated state; and a first tensioning cord anchored to a first anchoring area of the gas bag and to the second anchoring point of the vehicle for maintaining the gas bag tightly held to the vehicle, wherein the tensioning cord is tensioned as the gas bag inflates,
   wherein the tensioning cord extends between the first anchoring area of the gas bag and the second anchoring point of the vehicle, and wherein the distance between the second anchoring point and the first anchoring area is greater than the distance between the first anchoring point and the first anchoring area, and
   wherein the first anchoring area of the gas bag moves away from the second anchoring point of the vehicle as the gas bag inflates.

2. The gas bag arrangement according to claim 1, further including at least a first guide on the gas bag at one end thereof for guiding the tensioning cord, wherein the first guide is positioned closer to the second anchoring point of the vehicle than the first anchoring area of the gas bag.

3. The gas bag arrangement according to claim 1, further including a second tensioning cord anchored to at least a second anchoring area of the gas bag and to the first anchoring point of the vehicle.

4. The gas bag arrangement according to claim 3, further including first and second guides on the first and second anchoring areas of the gas bag for guiding the first and second tensioning cords, wherein the first tensioning cord is anchored to the first guide and guided on the second guide and the second tensioning cord is anchored to the second guide and guided on the first guide, the first and second anchoring areas of the gas bag being located at sites where, with unrestricted gas bag expansion, the largest expansion of the gas bag would tend to occur during inflation of the gas bag.

5. The gas bag arrangement according to claim 4, wherein the gas bag has an irregular contour where at least one of the first and second guides is anchored to the gas bag.

6. The gas bag arrangement according to claim 5, wherein the irregular contour comprises one of an indentation and bulge.

7. The gas bag arrangement according to claim 3, wherein each of the first and second guides includes a return lock that allows the respective first or second tensioning cord to tension as the gas bag is inflating, but prevents the respective first or second tensioning cord from moving in the opposite direction.

8. The gas bag arrangement according to claim 7, wherein each return lock has two relatively movable wedges, wherein the respective first or second tensioning cord extends between opposing wedge faces thereof, and at least one elastically deformable member for pressing the two wedges against each other.

9. The gas bag arrangement according to claim 8, wherein the opposing wedge faces have grooves that extend substantially perpendicularly to the direction of movement of the tensioning cord.

10. The gas bag arrangement according to claim 8, wherein one of the two wedges is fixedly mounted relative to the gas bag while the other of the two wedges is displaceable opposite the fixed wedge and is biased against the fixedly mounted wedge with the elastically deformable member.

11. The gas bag arrangement according to claim 10, wherein the elastically deformable member comprises a draw spring and the active direction of the spring runs substantially against the pull direction of the tensioning cord during unfolding of the gas bag.

12. The gas bag arrangement according to claim 1, wherein the second anchoring point of the vehicle is adjacent to one end of the gas bag.

13. The gas bag arrangement according to claim 1, wherein the tensioning cord includes a non-elastic or elastically deformable material.

14. The gas bag arrangement according to claim 1, wherein the gas bag is a lateral gas bag.

15. The gas bag arrangement according to claim 14, wherein the lateral gas bag has a tubular shape.

16. A gas bag arrangement as claimed in claim 1, wherein the side structure of the vehicle comprises side pillars of the vehicle.

17. A gas bag arrangement for a vehicle having a curved storage area and first and second anchoring points, comprising:
   a gas bag stored in the curved storage area in a non-inflated state;
   a first tensioning cord anchored to at least a first anchoring area of the gas bag and to one of the first and second anchoring points of the vehicle for maintaining the gas bag tightly held to the vehicle, wherein the tensioning cord is tensioned as the gas bag inflates; and
   at least one guide on the gas bag for guiding the tensioning cord,
   wherein the guide moves away from the first anchoring point as the gas bag inflates.

18. The gas bag arrangement according to claim 17, wherein the guide has a return lock that allows the tensioning cord to tension as the gas bag is inflating, but prevents the tensioning cord from moving in the opposite direction.

19. The gas bag arrangement according to claim 18, further including a second tensioning cord anchored to at least a second anchoring area of the gas bag and to the other of the first and second anchoring points of the vehicle, and another guide on the gas bag for guiding the second tensioning cord, each of the guides having a return lock that allows the respective first or second tensioning cord to tension as the gas bag is inflating, but prevents the respective first or second tensioning cord from moving in the opposite direction.

20. The gas bag arrangement according to claim 17, further including at least one additional guide provided between the one guide and the first anchoring area of the gas bag.

21. The gas bag arrangement according to claim 17, further including at least one support guide in a middle area of the gas bag, which is susceptible to kink, for further guiding the tensioning cord.

22. A gas bag arrangement as claimed in claim 17, wherein the first and second anchoring points are located on adjacent side pillars of the vehicle.

23. A gas bag for a vehicle anchored to at least two points of the vehicle outside of the gas bag and stored in a non-inflated state in a curved storage area, including:
- a tensioning cord for shortening the unfolded gas bag between the gas bag and a fastening point on the vehicle, wherein the inflating gas bag tensions the tensioning cord,
- another tensioning cord,
- wherein the tensioning cords are crisscrossing tensioning cords having a double return lock provided at their cross-over point.

24. A vehicle having first and second anchoring points comprising:
- a gas bag stored along a storage area of the vehicle in an un-inflated state; and first and second tensioning cords attached to at least first and second anchoring areas of the gas bag and to the first and second anchoring points of the vehicle for maintaining the gas bag tightly held to the vehicle when the gas bag is inflated,
- wherein the first tensioning cord is anchored to the first anchoring area of the gas bag and the second anchoring point of the vehicle, and the second tensioning cord is anchored to the second anchoring area of the gas bag and the first anchoring point of the vehicle,
- wherein the distance between the first anchoring area and the second anchoring point is greater than the distance between the second anchoring area and the second anchoring point; and the distance between the second anchoring area and the first anchoring point is greater than the distance between the first anchoring area and the first anchoring point.

25. The vehicle according to claim 24, wherein the tensioning cords are configured to draw the two anchoring areas toward each other as the gas bag inflates.

26. The vehicle according to claim 24, further including at least two guides anchored to the gas bag and positioned adjacent to opposite ends of the gas bag when the gas bag is inflated, wherein the tensioning cords each are guided through the two guides, and wherein during inflation of the gas bag, the gas bag moves the tensioning cords substantially in opposite directions to reduce the effective length of the tensioning cords extending between the two vehicle anchoring points.

27. The vehicle according to claim 24, further including first and second guides anchored respectively to the first and second anchoring areas of the gas bag, which areas are positioned adjacent to opposite ends of the gas bag when the gas bag is inflated, wherein the first and second tensioning cords each are guided through one of the first and second guides positioned closer to the respective first or second anchoring point, and wherein during inflation of the gas bag, the gas bag moves the tensioning cords substantially in the opposite directions.

28. The vehicle according to claim 24, further including at least one guide, wherein the gas bag is provided with an inward bulge upon the gas bag being inflated and the guide being positioned at the inward bulge for guiding both, the first and second tensioning cords along the bulge.

29. The vehicle according to claim 24, wherein the gas bag is directly anchored to a third anchoring point of the vehicle.

30. The vehicle according to claim 24, further including a first guide through which both of the first and second tensioning cords pass.

31. The vehicle according to claim 30, further including second and third guides through which the first and second tensioning cords pass.

* * * * *

UNITED STATES PATENT AND TRADEMARK OFFICE
CERTIFICATE OF CORRECTION

PATENT NO. : 6,494,486 B2
DATED : December 17, 2002
INVENTOR(S) : Thobias Pausch, Dieter Markfort and Heinz-Dieter Adomeit It is certified that error appears in the above-identified patent and that said Letters Patent is hereby corrected as shown below:

<u>Title page,</u>
Item [75] Inventors, please change the third named inventor from "Heinz-dieter Adomeit)" to -- Heinz-Dieter Adomeit --

Signed and Sealed this

Second Day of September, 2003

JAMES E. ROGAN
*Director of the United States Patent and Trademark Office*